United States Patent
He et al.

(10) Patent No.: US 9,823,412 B2
(45) Date of Patent: Nov. 21, 2017

(54) EDGE TYPE BACKLIGHT MODULE AND LIQUID CRYSTAL DISPLAY DEVICE

(71) Applicant: Shenzhen China Star Optoelectronics Technology Co., Ltd., Shenzhen, Guangdong (CN)

(72) Inventors: Hu He, Guangdong (CN); Yi-cheng Kuo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 291 days.

(21) Appl. No.: 14/400,785

(22) PCT Filed: Sep. 16, 2014

(86) PCT No.: PCT/CN2014/086633
§ 371 (c)(1),
(2) Date: Nov. 12, 2014

(87) PCT Pub. No.: WO2016/037376
PCT Pub. Date: Mar. 17, 2016

(65) Prior Publication Data
US 2016/0274293 A1    Sep. 22, 2016

(30) Foreign Application Priority Data
Sep. 9, 2014 (CN) .......................... 2014 1 0456517

(51) Int. Cl.
G02F 1/1335 (2006.01)
F21V 7/04 (2006.01)
F21V 8/00 (2006.01)

(52) U.S. Cl.
CPC ......... G02B 6/0083 (2013.01); G02B 6/0068 (2013.01); G02B 6/0085 (2013.01);
(Continued)

(58) Field of Classification Search
CPC .. G02B 6/0083; G02B 6/0085; G02B 6/0088; G02B 6/0091; G02B 6/0073;
(Continued)

(56) References Cited

U.S. PATENT DOCUMENTS

2012/0261682 A1* 10/2012 Zhang .................. G02B 6/0018
257/89
2015/0234117 A1* 8/2015 Kamada ............... G02B 6/0085
349/62

FOREIGN PATENT DOCUMENTS

CN          102155694 A       8/2011

* cited by examiner

Primary Examiner — Nathanael R Briggs
(74) Attorney, Agent, or Firm — Andrew C. Cheng

(57) ABSTRACT

The invention discloses an edge type backlight module. The edge type backlight module includes: a back frame having at least one sidewall and at least one bottom plate; a light guide plate disposed on the bottom plate and having a light incident side surface, wherein the light incident side surface is opposite to the sidewall; and a plurality of first backlight sources and a plurality of second backlight sources, wherein the first backlight sources are disposed on the sidewall, the second backlight sources are disposed on the bottom plate and against the sidewall, the first backlight sources and the second backlight sources are alternately disposed, the first backlight sources include a plurality of first LED lamps, and the second backlight sources include a plurality of second LED lamps. The invention also discloses a liquid crystal display device having the edge type backlight module. The COF of the invention is disposed on a portion of the second backlight sources with a lower temperature, so that the COF is in a lower temperature condition, thereby improving its reliability.

2 Claims, 2 Drawing Sheets

(52) U.S. Cl.
CPC ......... *G02B 6/0088* (2013.01); *G02B 6/0091* (2013.01); *G02F 1/1336* (2013.01)

(58) Field of Classification Search
CPC ....... G02B 6/0086; G02B 6/0068; F21S 8/00; F21V 19/00; F21V 29/00
See application file for complete search history.

EDGE TYPE BACKLIGHT MODULE AND LIQUID CRYSTAL DISPLAY DEVICE

BACKGROUND OF THE INVENTION

Field of the Invention

This invention belongs to the technical field of liquid crystal display, in particular, to an edge type backlight module and a liquid crystal display device.

Description of Related Art

With the evolution of optical and semiconductor technology, also led to the flat panel display (Flat Panel Display) to flourish, and in many flat panel displays, liquid crystal display device (Liquid Crystal Display, referred to as LCD) because of its superior characteristics in high space utilization efficiency, low power consumption, no radiation, and low electromagnetic interference and so on, has become the mainstream of the market.

The liquid crystal display device generally includes a liquid crystal display panel (Liquid Crystal Panel) and the backlight module (Back Light Module, abbreviated BL). Since the LCD panel itself does not have the characteristics of self-luminous, it must utilize the LCD backlight module providing the necessary surface light source, then the image can be displayed via a surface light source provided by the backlight module to liquid crystal display panel.

Backlight module is divided into two different type including edge type backlight module and direct type backlight module according to the position of the light source. The direct type backlight module light source (e.g., a cathode fluorescent lamp (Cold Cathode Fluorescent Lamp, CCFL) or light emitting diodes (Light Emitting Diode, LED)) is disposed behind the liquid crystal display panel, so a surface light source is formed directly to the liquid crystal display panel. The edge type backlight module is the light source (such as LED light strip (Light Bar)) provided in the LCD backplane side of the rear edge of the panel generally, the light emitted from the LED strip entering light guide plate (Light Guide Plate, LGP) from its side, emitting from the light guide plate exit surface after diffusion and emission by the optical film module, then set to form the surface light source and to be supplied to the liquid crystal display panel. However, the LED light bar is set at the edge of the liquid crystal display panel in the rear side of the backplane for the edge type backlight module, resulting to a higher temperature on the edge of the back plate. When the liquid crystal display panel is placed on top of the backlight module, which the edge of the COF (Chip On Film) will be at a higher temperature condition, so the reliability of COF degrades significantly.

SUMMARY OF THE INVENTION

In order to solve the above issue in current technology, an object of the present invention is to provide an edge type backlight module comprising: a back frame having at least one sidewall and at least one bottom plate; light guide plate disposed on base plate and having a light incident side surface, wherein the location of light incident surface is opposite to the sidewall; a plurality of first backlight sources and a plurality of second backlight sources, wherein the first backlight sources disposed on the sidewall and the second backlight sources disposed on base plate against the sidewall and are alternately disposed. The first backlight sources comprise a first plurality of LED lamps and the second backlight sources comprise a second plurality of LED lamps.

Moreover, the first backlight sources further comprise a first circuit board, wherein a plurality of LED lamps disposed on the first surface of the first circuit board and the emitting direction of the first LED lights is perpendicular to the first circuit board surface; the first backlight sources also include a second circuit board, wherein a plurality of LED lamps disposed on a second surface of second circuit board, and light emitting direction of the second LED lamps is parallel to the surface of the second circuit board.

Furthermore, the edge type backlight module further includes a first cooling member, the first cooling member comprises a first cross cooling piece and vertically connected a plurality of first upright cooling pieces; wherein the first upright cooling pieces disposed between the first backlight sources and corresponding sidewall; the first cross cooling piece located between two upright pieces is disposed between the corresponding second backlight sources and the bottom plate.

Moreover, the edge type backlight module further includes a third circuit board, the third circuit board includes a cross circuit board and vertically connected to a plurality of upright circuit boards; wherein the first backlight sources provided on the surface of the corresponding upright circuit boards, and the light emitting direction of the first plurality of LED lamps is perpendicular to the surface of upright circuit boards; second backlight source provided on partial surface of corresponding cross circuit board is located between two upright circuit boards, the light emitting direction of the second plurality of LED lamps is parallel to the surface of cross circuit board;

Further, the edge type backlight module further includes a second cooling member comprising a second cross cooling piece and vertically connect to the second upright piece, wherein the second upright cooling piece is disposed between a plurality of circuit boards and corresponding sidewall, the second cross cooling piece is disposed between the cross circuit board and the bottom plate.

Another object of the present invention is to provide a liquid crystal display device comprising an edge type backlight module, and the liquid crystal display panel set with edge type backlight module, wherein the edge type backlight module comprising: a back frame having at least one sidewall and at least one bottom plate; light guide plate disposed on base plate and having a light incident side surface, wherein the light incident side surface is opposite to the sidewall; a plurality of first backlight sources and a plurality of second backlight sources, wherein the first backlight sources disposed on the sidewall and the second backlight sources disposed on base plate against the sidewall alternately, the first backlight sources include a plurality of first LED lamps and the second backlight sources include a plurality of second LED lamps.

Moreover, the first backlight sources further comprise a first circuit board, wherein a plurality of LED lamps disposed on the surface of the first circuit board and the light emitting direction of the first LED lamps are perpendicular to the surface of first circuit board; first backlight sources include a second circuit board as well, wherein a plurality of LED lamps disposed on the surface of second circuit board, and the light emitting direction of the second LED lamps are parallel to the surface of the second circuit board.

Further, the edge type backlight module further includes a first cooling member, the first cooling member comprises a first cross cooling piece and vertically connected to a plurality of the first upright cooling pieces: wherein a plurality of the first upright cooling pieces are disposed between first backlight sources and corresponding sidewall and the first cross cooling piece disposed between the two of first upright cooling pieces is set between the corresponding second backlight sources and bottom plate.

In addition, the edge type backlight module further includes a third circuit board, the third circuit board includes a cross circuit board and perpendicularly connected to a plurality of upright circuit boards; wherein the first backlight sources provided on the corresponding surface of the upright circuit boards, and light emitting direction of the first LED lamps is perpendicular to the surface of upright circuit boards; second backlight sources provided at the corresponding partial surface of cross circuit board located between two upright circuit boards, and the light emitting direction of second LED lamps is parallel to the surface of the cross circuit board.

Furthermore, the edge type backlight module further includes a second cooling member, and the second cooling member comprises a second cross piece and the second upright piece perpendicular to the cross piece: wherein the second upright cooling piece are disposed between corresponding circuit board and sidewall, the second cross cooling piece are disposed between the cross circuit board and the bottom plate.

As the liquid crystal display panel is set with the edge backlight module, the COF (Chip On Film) on the edge can be disposed on the second backlight source with a lower temperature in the present invention. The reliability of COF can be improved due to lower temperature environment.

BRIEF DESCRIPTION OF THE DRAWINGS

The following description in conjunction with the accompanying drawings, the above and other aspects, features and advantages of embodiments of the present invention will be more apparent from the accompanying drawings.

DESCRIPTION OF THE EMBODIMENTS

Figure 1:
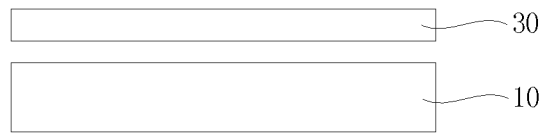
FIG. 1 is a schematic side view of apparatus according to a first embodiment of a liquid crystal display of the present invention.

Hereinafter, embodiments of the present invention are described in detail with reference to the attached figures. However, embodiments of the present invention can be performed by many different approaches, and the present invention should not be construed as limited to the specific embodiments set forth herein. Rather, these embodiments are provided to explain the principles of the invention and its practical application so that others skilled in the art to understand various embodiments and modifications suited to the particular potential applications of this invention.

In the attached figures, the same reference numerals will be used to denote the same elements. It will be understood that, although the term may be used herein "first", "second", and so on to describe various elements, these elements should not be limited by these terms. These terms are only used to distinguish one element from another.

First Embodiment

FIG. 1 is a schematic side view of a liquid crystal display device according to a first embodiment of the present invention.

Referring to FIG. 1, a first embodiment of the liquid crystal display device of the present invention includes an edge type backlight module 10 and the liquid crystal display panel 30. The liquid crystal display panel 30 is disposed above the edge type backlight module 10, the edge type backlight module 10 provides a light source to the LCD display panel 30 to display the image from liquid crystal display panel 30. It should be understood that the liquid crystal display device further includes other components according to the first embodiment of present invention, which are familiar by these people skilled in the art, and are not to be described here to make it simple and clear.

Hereinafter, the edge type backlight module 10 according to the first embodiment of the present invention is described in detail.

Figure 2:
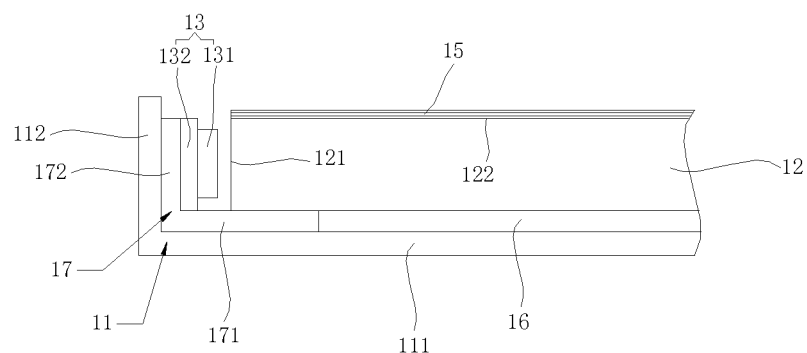
FIG. 2 is a schematic side view of the edge backlight module according to the first embodiment of the present invention.
Figure 3:
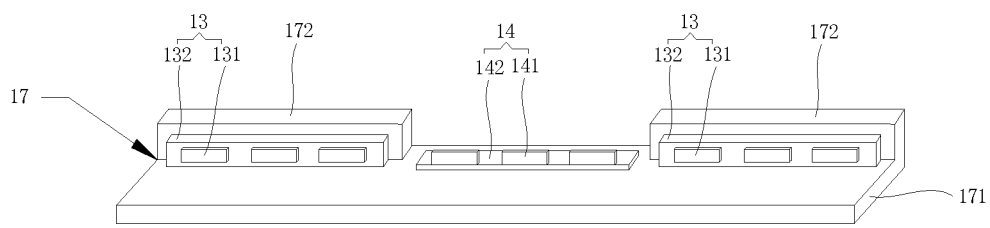
FIG. 3 is a schematic perspective view showing the first backlight source and the second backlight source mounted on the first cooling member according to the first embodiment of the present invention.

FIG. 2 is a schematic side view of the edge type backlight module according to a first embodiment of the present invention. FIG. 3 is a perspective schematic view of the first backlight source and the second backlight source mounted on the first cooling member according to the first embodiment of the present invention.

Referring to FIGS. 2 and 3, the edge type backlight module 10 according to the first embodiment of the present invention comprises: the back frame 11, a light guide plate 12, two first backlight source 13 and one second backlight source 14, an optical film module 15 and the reflection sheet 16. It should be understood that, the number of first backlight source 13 and second backlight source 14 are not limited as shown in FIG. 3 in the present invention, both of which can be arbitrarily increased or decreased based on the number of actual demand.

Specifically, the back frame 11 includes a bottom plate 111 and sidewall 112 substantially vertically connected to the bottom plate 111. It should be understood that the number of the sidewall 112 of back frame 11 is not limited as shown in FIG. 2. The light guide plate 12 has a light incident side surface 121 and a light emitting top surface 122 connected to 121. The light guide plate 12 is provided on the bottom plate 111 of the back frame 11, so the light incident side surface 121 is opposite to the sidewall 112 of the back frame 11. Optical film module 15 is disposed above the light emission top surface of the light guide plate 12, is utilized to collect the light emitted from light emitting top surface 122 and increase the light intensity emitted from light emitting top surface 122. Moreover, the upward light intensity can be increased and diffused after passing through optical film module 15, then uniform surface light source can be provided to liquid crystal display panel 200. The reflecting sheet 16 is disposed below the bottom surface of the light guide plate 110, is used to reflect the light back to light guide plate 12 to increase the light utilization in light guide plate 12. The first backlight source 13 is provided on the back frame 11 and the sidewall 112, a second backlight source 14 is provided on the bottom plate 111 of back frame 11 and against to sidewall 112 of the back frame 11, so that first backlight source 13 and second backlight source 14 are near to the light incident side surface 121 of the light guide plate 12, wherein the first backlight sources 13 and second backlight sources 14 are disposed alternately, and the first backlight sources 13 include a plurality of first LED light lamps 131, a second backlight sources 14 include a plurality of second LED light lamps 141. In this embodiment, the first LED lamps 131 may be used e.g. pins on the back of its light emitting direction (Top View) of the LED lamps, the second LED lamps 141 may be used e.g. pins on the side of its light emitting direction (Side View) LED lights; however, the present invention is not limited thereto. Thus, light emitting direction of the first LED lamps 131 is parallel to the surface of bottom plate 111 of back frame 11, while the light emitting direction of the second LED lamps 141 is perpendicular to the surface of bottom plate 111 on back frame 11. The light emitting surface of first LED lamps 131 and second LED lamps 141 are all toward to the light incident side surface 121 of the light guide plate 12.

Moreover, wherein the first backlight sources 13 further include a first printed circuit board (i.e., PCB board) 132, wherein a plurality of the first LED lamps 131 in the first backlight source 13 are installed at the surface of the first printed circuit board 132 and electrically connected to the first printed circuit board in order to provide power to each LED lamp. The light emitting direction first LED lamps 131 is perpendicular to the surface of first printed circuit board 132. The second backlight sources 14 further include a second printed circuit board (i.e., PCB board) 142, wherein a plurality of the second LED lamps 141 in the second backlight sources 14 are installed on the surface of the second printed circuit board 142 and electrically connected to the second printed circuit board. The light emitting direction second LED lamps 141 is parallel to the surface of first printed circuit board 132.

In addition, since the first backlight source 13 and the second backlight source 14 generate a lot of heat as emitting light, in order to dissipate the heat efficiently and enhance cooling performance, the edge type backlight module further includes the first cooling member 17 in the first embodiment of present invention. The first cooling member 17 comprises the first cross cooling piece 171 and two of the first upright cooling pieces 172 perpendicular to the first cross cooling piece 171. The amount of the first upright cooling pieces 172 is equal to the amount of first backlight sources 13, wherein the first upright cooling pieces 172 are located between the first backlight source 13 and the sidewall 112 of back frame 11, wherein a portion of the first cross cooling piece 171 located between two of the first upright cooling pieces 172 is set to the corresponding second backlight source 14 and bottom plate 111 of the back frame 11.

In the present embodiment, the input power of second LED lamps 141 of the second backlight source 14 is smaller, so the luminous flux is smaller and generated heat is lower, and the input power of first LED lamps 131 of the first backlight source 13 is larger, so luminous fluxes larger and generated heat is higher. Since the second backlight sources 14 and the first backlight sources 13 adopting the fault zone design and are installed at different locations of the cooling member 17, so that the heat generated by the first backlight sources 13 is not directly transferred to the second backlight sources 14. Therefore, as the liquid crystal display panel 30 is placed on the edge type backlight module 10, the COF (Chip On Film) on the edge is set on the second backlight sources 14 with lower temperature to make it under a lower temperature environment and improve the reliability. Meanwhile, the liquid crystal display panel 30 can receive sufficient brightness from the surface light source by using a larger light flux of the first backlight sources 13.

Second Embodiment

Figure 4:
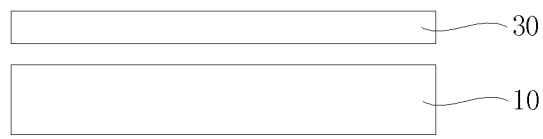
FIG. 4 is a schematic side view of a liquid crystal device according to a second embodiment of the present invention.

FIG. 4 is a schematic side view of a liquid crystal display device according to a second embodiment of the present invention.

Referring to FIG. 4, a second embodiment of the liquid crystal display device of the present invention includes an edge type backlight module 10 and the liquid crystal display panel 30. The liquid crystal display panel 30 is disposed above the edge type backlight module 10, the edge type backlight module 10 provides a light source to the LCD display panel 30 and makes the liquid crystal display panel 30 to display the image. It should be understood that the liquid crystal display device of the present invention further includes other components according to the second embodiment, these components are familiar by the people skilled in the art and is not repeated here to make it clear and simple.

Hereinafter, the edge type backlight module 10 according to the second embodiment of present invention is described in detail.

Figure 5:
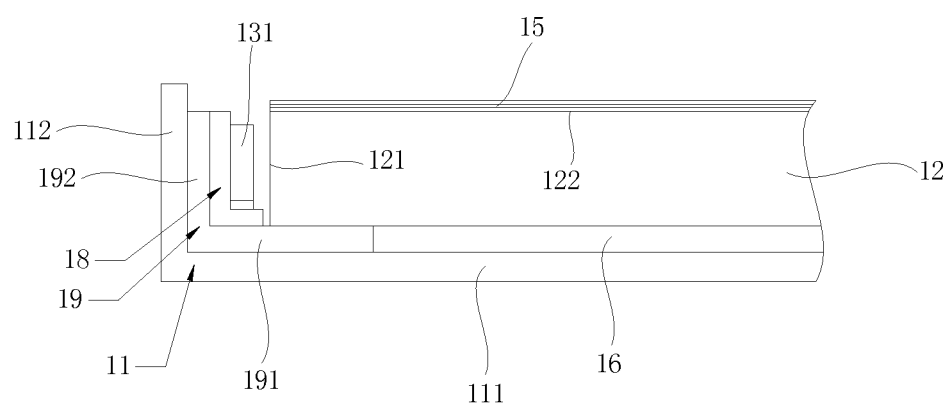
FIG. 5 is a schematic side view of the edge type backlight module according to a second embodiment of the present invention.
Figure 6:
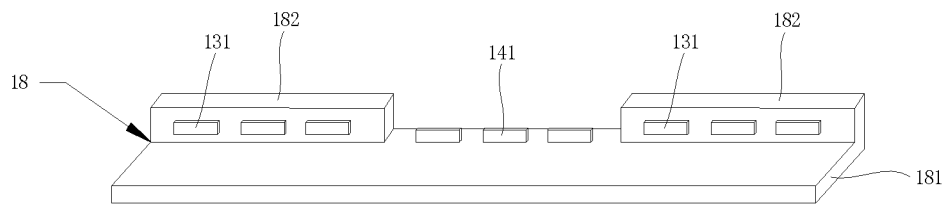
FIG. 6 is a schematic perspective view showing the first backlight source and the second backlight source mounted on the second cooling member according to the first embodiment of the present invention.

FIG. 5 is a schematic side view of the edge type backlight module according to a second embodiment of the present invention. FIG. 6 is a perspective schematic view of a cooling member mounted on the first and second backlight sources according to the second embodiment of the present invention.

Referring to FIGS. 5 and 6, the edge type backlight module 10 according to the second embodiment of the present invention includes: a back frame 11, a light guide plate 12, two first backlight sources 13 and one second backlight source 14, an optical film module 15 and the reflection sheet 16. It should be understood that the number of first backlight sources 13 and second backlight sources 14 are not limited as shown in figures and both can be arbitrarily increased or decreased according to the number of actual demand in the present invention.

Specifically, the back frame 11 includes a bottom plate 111 and a sidewall 112 substantially perpendicularly connected to the bottom plate 111. It should be understood that the number of the sidewall 112 connected to the back frame 11 as shown in FIG. 2 is not limited. The light guide plate 12 has a light incident side surface 121 and the light emitting top surface 122 connected to light incident side surface 121. The light guide plate 12 is provided on the bottom plate 111 of the back frame 11, so the light incident side surface 121 is opposite to the sidewall 112 of back frame 11. Optical film module 15 is disposed above the light emitting top surface 122 of light guide plate 12 to collect the light emitted from light emitting top surface 122, so light intensity emitted from light emitting top surface can be increased. Moreover, the upward brightness of light can be increased and diffused as passing through optical film module 15, then providing an uniform surface light source to liquid crystal display panel 200.

The reflecting sheet 16 is disposed below the bottom surface of the light guide plate 110, is used to reflect the light back to light guide plate 12 to increase the light utilization in light guide plate 12. The first backlight sources 13 are provided on the back frame 11 and the sidewall 112 and the second backlight sources 14 are provided on the bottom plate 111 of the back frame 11 and against to the sidewalls 112 of the back frame 11, so the first backlight sources 13 and the second backlight sources 14 are adjacent to the light incident side surface 121 of the light guide plate 12. Wherein the first backlight sources 13 and second backlight sources 14 are disposed alternately, and the first backlight sources 13 include a plurality of first LED light lamps 131, a second backlight sources 14 include a plurality of second LED light lamps 141. In this embodiment, the first LED lamps 131 may be used e.g. pins on the back of its light emitting direction (Top View) of the LED lamps, the second LED lamps 141 may be used e.g. pins on the side of its light emitting direction (Side View) LED lights; however, the present invention is not limited thereto. Thus, light emitting direction of the first LED lamps 131 is parallel to the surface of bottom plate 111 of back frame 11, but light emitting direction of the second LED lamps 141 is perpendicular to the surface of bottom plate 111 of back frame 11. The light emitting surface of first LED lamps 131 and second LED lamps 141 are all toward to the light incident side surface 121 of the light guide plate 12.

Moreover, it further includes the third circuit board 18 in edge type backlight module 10 in order to provide power to each LED lamp according to the second embodiment of present invention, wherein the third circuit board 18 includes the cross circuit board 181 and two vertically connected upright circuit boards 182. i.e., the number of the upright circuit board 182 is equal to the number of first backlight sources 13. Wherein the first backlight sources 13 are disposed on the surface of the corresponding upright circuit boards 182, and the light emitting direction of the first LED lamps 131 in the first backlight source is perpendicular to the surface of upright circuit board; wherein the second backlight sources 14 are disposed on a partial surface of corresponding cross circuit board 181 located between two upright circuit boards 182 and the emitting direction of second LED lamps 141 in the second backlight source 14 is parallel to the surface of cross circuit board 181.

Furthermore, since a large amount of heat is generated from the first backlight sources 13 and the second backlight sources 14, the edge type backlight module 10 further comprises the second cooling member 19 according to the second embodiment of present invention in order to dissipate the generated heat and enhance cooling performance. The second cooling member 19 includes the second cross cooling piece 191 and vertically connected the second upright cooling pieces 192. Wherein the second upright cooling pieces 192 are disposed between two upright circuit boards 182 and sidewall 112 of back frame 11, and the second cross cooling piece 191 is disposed between the cross circuit board 181 and bottom plate 111 of back frame 11.

In the present embodiment, the input power of the second LED lamps 141 in the second backlight source 14 is smaller, so the luminous flux is smaller and the generated heat is smaller; while the input power of the first LED lamps in the first backlight source is larger, so the luminous flux is larger and the generated heat is larger. Since the second backlight sources 14 and the first backlight sources 13 adopting the fault zone design are installed on different locations of the third circuit board 18, the heat generated by the first backlight sources 13 is not transferred to the second backlight sources 14. As liquid crystal display panel 30 is disposed on the edge type backlight module 10, the COF (Chip On Film) near the edge is set on the second backlight source 14 with lower temperature to make COF (Chip On Film) under a lower temperature condition and enhance its reliability. Moreover, the liquid crystal display panel 30 can receive enough light intensity from the surface light source due to using the first back light sources 13 with larger luminous flux.

Although refer to specific embodiments shown and described the present invention, those skilled in the art will understand: without departing from the spirit and scope of the appended claims and equivalents thereof according to the present invention, various changes can be made on the form and corresponding details.

What is claimed is:

1. An edge type backlight module, comprising:
a back frame having at least one sidewall and at least one bottom plate;
a light guide plate disposed on the bottom plate and having a light incident side surface, wherein the light incident side surface is opposite to the sidewall;
a plurality of first backlight sources and a plurality of second backlight sources, wherein the first backlight sources are disposed on the sidewall, the second backlight sources are disposed on the bottom plate and against the sidewall, the first backlight sources and the second backlight sources are disposed alternately, the first backlight sources include a plurality of first LED lamps, and the second backlight sources include a plurality of second LED lamps; and
a circuit board, wherein the circuit board includes a cross circuit board and a plurality of upright circuit boards perpendicularly connected to the cross circuit board, the first backlight sources are disposed on surfaces of the corresponding upright circuit boards, a light emitting direction of the first LED lamps is perpendicular to the surfaces of the upright circuit boards, the second backlight sources are disposed on a surface of the corresponding portion of the cross circuit board placed between two of the upright circuit boards, and a light emitting direction of the second LED lamps is parallel to the surface of the cross circuit board,
wherein the upright circuit boards are separated from each other.

2. The edge type backlight module according to claim 1, further comprising a cooling member, wherein the cooling member comprises a cross cooling piece and a upright cooling piece vertically connected to the cross cooling piece, the upright cooling piece is disposed between the upright circuit boards and the sidewall, and the cross cooling piece is disposed between the cross circuit board and the bottom plate.

* * * * *